United States Patent [19]

Carlson

[11] Patent Number: 5,524,831
[45] Date of Patent: Jun. 11, 1996

[54] FISHING REEL

[75] Inventor: Ben A. Carlson, Racine, Wis.

[73] Assignee: Johnson Worldwide Associates, Sturtevant, Wis.

[21] Appl. No.: 329,329

[22] Filed: Oct. 26, 1994

[51] Int. Cl.$^6$ .................................................. H01K 89/01
[52] U.S. Cl. .......................... 242/223; 33/707; 242/224; 242/305
[58] Field of Search .................................. 242/223, 224, 242/230, 305, 322, 323; 33/706, 707

[56]        References Cited

U.S. PATENT DOCUMENTS

| | | | |
|---|---|---|---|
| 2,619,559 | 11/1952 | Schenkel | 242/305 X |
| 4,402,470 | 9/1983 | Hamayasu | 242/223 X |
| 4,790,492 | 12/1988 | Atobe | 242/223 |
| 4,874,140 | 10/1989 | Hitomi | 242/223 |
| 5,345,691 | 9/1994 | Falk et al. | 242/223 X |

FOREIGN PATENT DOCUMENTS

| | | | |
|---|---|---|---|
| 1102765 | 10/1955 | France | 242/223 |
| 2657752 | 8/1991 | France | 242/305 |
| 4-91734 | 3/1992 | Japan | 242/305 |
| 6-98663 | 4/1994 | Japan | 242/305 |
| 6-141741 | 5/1994 | Japan | 242/305 |

*Primary Examiner*—Joseph J. Hail, III
*Attorney, Agent, or Firm*—Foley & Lardner

[57]           ABSTRACT

An apparatus for use with a fishing reel for indicating line travel during line payout from the reel. The apparatus preferably comprises a light source coupled with the reel, a light sensor optically coupled with the light source, and an indicating means coupled with the light sensor. The light source and the light sensor are oriented appropriately that the optical coupling is interrupted or made as the line pays out from the reel. The light source is an active light source fixedly mounted with respect to the spool, and the light sensor is mounted substantially adjacent the light source.

9 Claims, 2 Drawing Sheets

FISHING REEL

BACKGROUND OF THE INVENTION

The present invention relates to fishing reels, and in particular to an improved fishing reel including an apparatus for indicating paying out of line from the fishing reel. The fishing reel has a substantially stationary spool upon which the fishing line is wound or from which the fishing line is unwound during fishing operations.

It is often useful for an angler to know the amount of line which is out during fishing operations. Such information is useful for determining the distance the line has been cast or the depth of the water in which the line is deployed. It is useful to be able to determine the amount of line deployed either in meters or in yards or feet.

It is particularly useful for an angler to be able to employ such an apparatus for determining the amount of line deployed at night or in other low-light conditions.

It is also useful for such a fishing reel to have a work light which may be aimed to illuminate selected areas in order to facilitate night fishing operations. Such a work light should preferably be cool burning and emit no infrared-band light which would impair the angler's night vision.

SUMMARY OF THE INVENTION

An apparatus for use with a fishing reel or incorporated in a fishing reel for indicating line travel during line payout from the reel. The preferred embodiment of the apparatus comprises a light source coupled with the reel, a light sensor optically coupled with the light source, and an indicating means coupled with the light sensor. The light source and the light sensor are oriented appropriately that the optical coupling is interrupted by the line as the line pays out from the reel.

In some embodiments, the apparatus is also configured to sense line retrieval to indicate either how much line has been retrieved or how much line remains deployed from the reel. In some embodiments, other sensors may be employed: Hall Effect sensors may sense passage of magnetic fields carried by or generated by the line; capacitive sensors may detect changes in capacitance occasioned by passage of the line; voltage sensors may detect changes in voltage or static potential caused by passage of the line; inductive sensors may detect changes in inductance caused by passage of the line. Of course, some modifications may be made in the line to enhance the effect sought to be detected (e.g., magnetic effect, inductive effect, capacitive effect).

In its preferred embodiment, the light source is an active light source, such as a light emitting diode, fixedly mounted with respect to the spool, and the light sensor is mounted substantially adjacent the light source. The light source and the light sensor are oriented appropriately that an optical coupling is established by the line reflecting light from the light source to the light sensor as the line pays out from the reel. The fishing reel may also include an illumination means for illuminating a zone adjacent the reel to provide a work light. The illumination means is preferably an electroluminescent lamp which burns cool and emits no infrared-band light which would impair the night vision of a user.

It is, therefore, an object of the present invention to provide an apparatus for use with a fishing reel for indicating line payout from the reel which is appropriate for use with a spinning reel having a stationary spool upon which line is wound during retrieval and from which line is unwound during deployment.

It is a further object of the present invention to provide an apparatus for use with a fishing reel for indicating line payout from the reel which is capable of operating at night or in other low-light conditions.

Yet a further object of the present invention is to provide an improved fishing reel which incorporates a work light which is cool burning and emits no infrared-band light.

Further objects and features of the present invention will be apparent from the following specification and claims when considered in connection with the accompanying drawings illustrating the preferred embodiment of the invention.

DETAILED DESCRIPTION OF THE INVENTION

Figure 1:
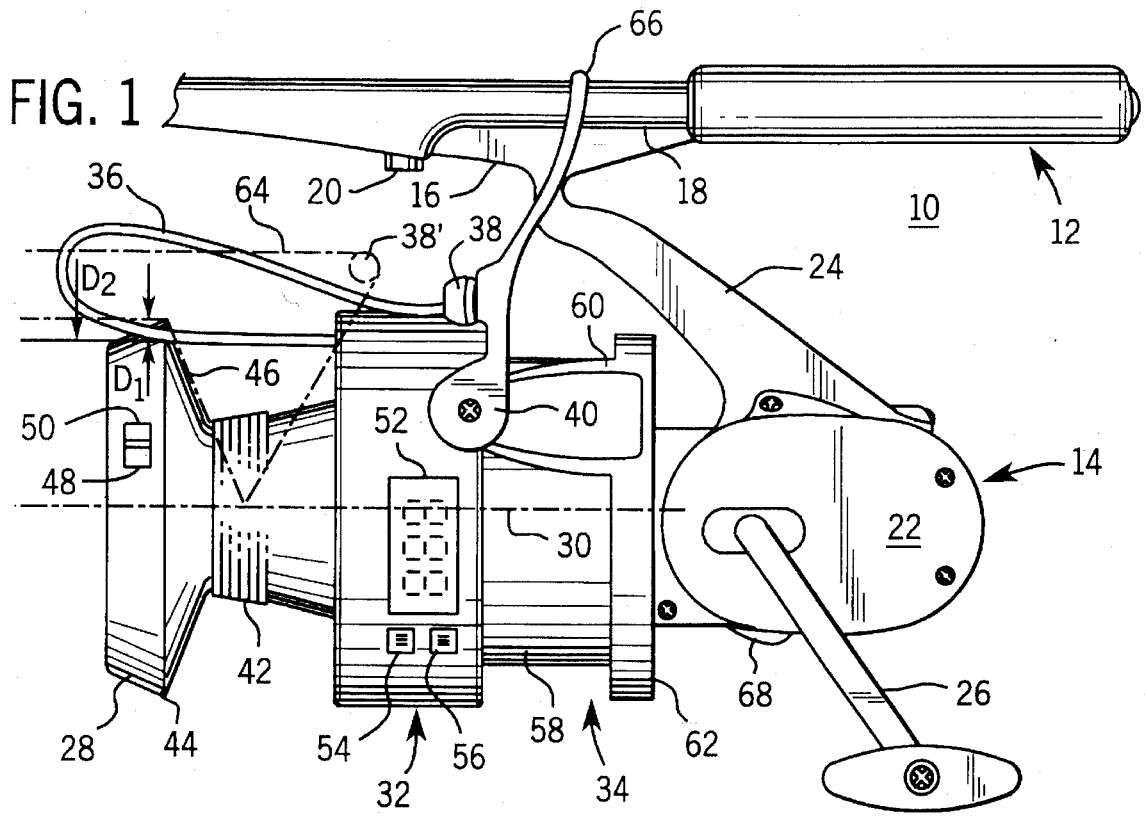
FIG. 1 is a side elevation view of a fishing reel configured according to the preferred embodiment of the present invention with the line retrieval assembly in a first position.

FIG. 1 is a side elevation view of a fishing reel configured according to the preferred embodiment of the present invention with the line retrieval assembly in a first position. In FIG. 1, a fishing assembly 10 is illustrated including a fishing rod 12 and a fishing reel 14. Fishing reel 14 is affixed to fishing rod 12 via a mounting shoe 16 slidingly engaged within a slot 18 on rod 12 and permanently affixed within slot 18 by a threaded fastener 20.

A fishing reel body 22 is suspended from mounting shoe 16 by an arm 24 and includes a hand crank assembly 26. A spool 28 is substantially stationary and symmetrically situated about an axis 30. Internal mechanical connections (not shown in FIG. 1) well known to those skilled in the art, connect hand crank 26 with a rotating line retrieval assembly 34. A nonrotating base section 32 supports spool 28 and line retrieval assembly 34. Line retrieval assembly 34 includes a bail 36 attached to a line fairlead 38. Fairlead 38 and bail 36 are in mechanical communication with a cam member 40. Bail 36 may be placed in the position illustrated in FIG. 1 for line casting to permit line 42 wound on spool 28 to unwind and deploy from spool 28 over rim 44 substantially along the dotted line indicated as path 46 in FIG. 1. In such a casting operation, path 46 will situate line 42 substantially adjacent a light source 48. In the preferred embodiment, light source 48 is substantially co-located with a light sensor 50. Thus, as line 42 unwinds from spool 28 generally along path 46 substantially adjacent light source 48 and light sensor 50, light source 48 intermittently illuminates line 42 as it passes by light source 48, line 42 reflects light from light source 48 appropriately to be detected by light sensor 50. In such manner, each pass of line 42 adjacent light source 48 and light sensor 50 during a line deployment operation such as line casting is detected by light sensor 50. Alternatively, the light source and light sensor may be substantially oriented in an optical coupling relationship on an axis with a gap intermediate the light source and the light sensor. In this arrangement, the line repeatedly effects traversal of the gap during the line payout, interrupting the optical coupling during each traversal.

Light sensor 50 is coupled with a microprocessor (FIG. 3) within fishing reel 14 and the microprocessor is coupled with a display unit 52, such as a liquid crystal display unit. Switches 54, 56 may control functions of the line counting system (comprising light source 48, light sensor 50, the microprocessor, display unit 52, and switches 54, 56) such as on/off, display in yards or meters, or such other system functions as may occur to one skilled in the art.

Line retrieval assembly 34 includes a body 58 and a plurality of stanchions 60 spaced peripherally around rim 62 of line retrieval assembly 34. In FIG. 1, only one stanchion 60 is visible and, in alternate embodiments, the plurality of stanchions 60 may be configured as a circumferential skirt surrounding body 58 and substantially comprising an extension of rim 62.

Spool 28 and base section 32 remain rotationally stationary with respect to fishing reel body 22 as hand crank assembly 26 is turned. Responsive to turning hand crank assembly 26, line retrieval assembly 34 rotates about axis 30, cam member 40 encounters a cam stop (not shown) to trip bail 36 and its attached line fairlead 38 to a second orientation to engage line 42 about line fairlead 38 with bail 36 overreaching spool 28, thus configuring fishing reel 14 for line retrieval (see FIG. 2). Continued turning of hand crank assembly 26 retrieves line 42 substantially along the dotted line path indicated at 64 when line fairlead 38 is in the position indicated as 38'.

As line fairlead 38 rotates about axis 30 and lays line 42 upon spool 28, a cam extension 66 passes substantially adjacent light source 48 and light sensor 50 to provide reflective optical coupling intermediate light source 48 and light sensor 50 by reflecting light from cam extension 66 as cam extension 66 passes over light source 48 and light sensor 50. This structure is necessary in the configuration illustrated in FIG. 1 because of the difference in distances $D_1$ and $D_2$. Distance $D_1$ is the distance between path 46 and light sensor 50 and is sufficiently small to enable sensing by light sensor 50 of light reflected by line 42 from light source 48. However, during retrieval operations when line 42 travels along path 64 via line fairlead 38 to be laid upon spool 28, it is distance $D_2$ which separates line 42 from light source 48 and light sensor 50. Distance $D_2$ is often too great to reliably provide optical reflective coupling involving line 42 as it travels on path 64. Cam extension 66 (in the position illustrated in FIG. 2) provides the required reflective optical coupling between light source 48 and light sensor 50.

In an alternate embodiment, rim 44 of spool 28 may be expanded to a larger diameter to substantially reduce distance $D_2$ and thereby preclude any requirement for an extension such as cam extension 66 to provide reflective light coupling during line retrieval operations. However, expansion of rim 44 to too great a diameter may impair line casting efficiency. In any event, a switch (FIG. 3) responsive to cam member 40 senses position of and indicates to the microprocessor (FIG. 3) whether a line deployment or line retrieval operation is being conducted. In such manner, the microprocessor is configured appropriately to count up or count down to properly reflect the operation in which the reel is engaged.

As hand crank assembly 26 continues to turn, base section 32 is reciprocally displaced along axis 30.

In order to facilitate understanding the present invention, like elements will be identified by like reference numerals in the various drawings.

Figure 2:
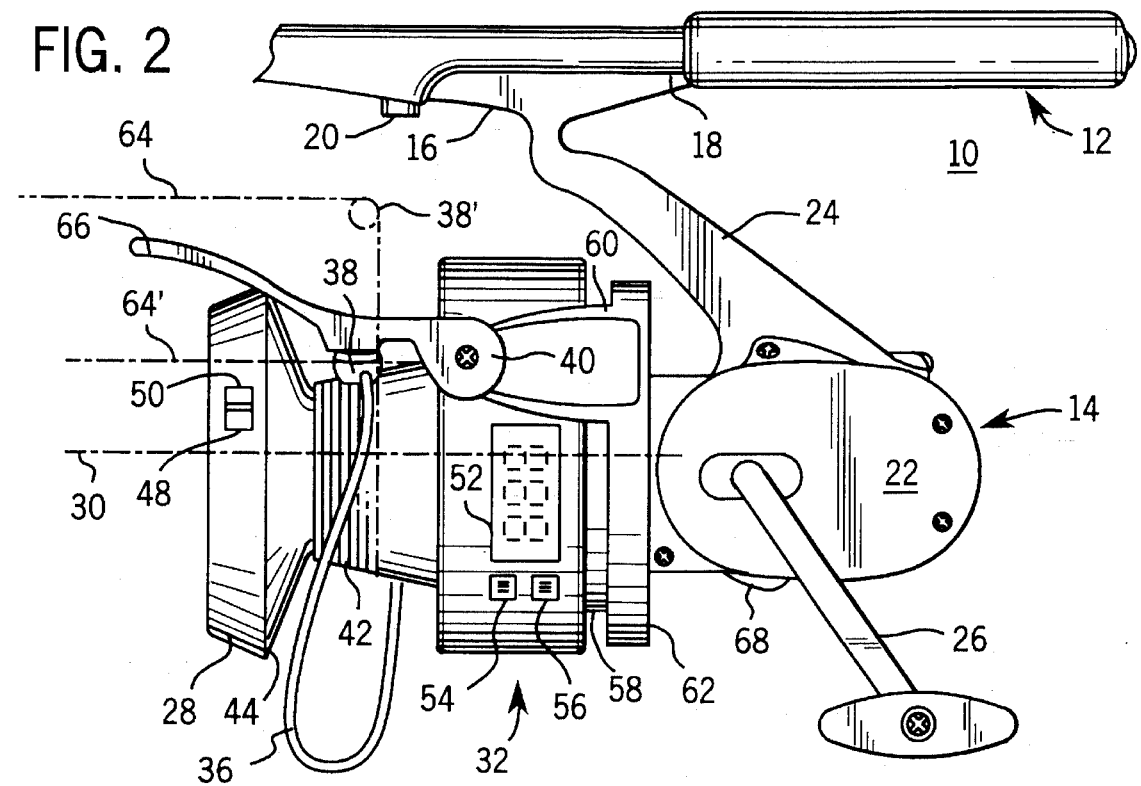
FIG. 2 is a side elevation view of a fishing reel configured according to the preferred embodiment of the present invention with the line retrieval assembly in a second position.

FIG. 2 is a side elevation view of a fishing reel configured according to the preferred embodiment of the present invention with the line retrieval assembly in a second position and with bail 36 and its attached line fairlead 38 positioned for line retrieval. In FIG. 2, base section 32 has travelled further to the right along axis 30 than was illustrated in FIG. 1 in response to continued turning of hand crank assembly 26. It is by such rotational motion by line retrieval assembly 34 about axis 30 with simultaneous axially reciprocal motion by base section 32 along axis 30 in response to continued turning of hand crank assembly 26 that fishing reel 14 effects line retrieval operations. During line retrieval operations, line 42 is placed on spool 28 in successive layers reciprocally arranged along axis 30 on spool 28. Such rotating reciprocal action to retrieve line by a spinning reel is known to those skilled in the art.

A further feature of the preferred embodiment of fishing reel 14 as illustrated in FIGS. 1 and 2 is the provision of a work light 68. Work light 68 is preferably comprised of an electroluminescent light which is compact and flexible so that it may easily be affixed to fishing reel body 22 (or to another portion of fishing assembly 10) and internally connected with a power source (not shown). The power source may be carried internally of fishing assembly 10. Alternatively, fishing assembly 10 may be configured to accommodate connection of work light 68 to an external power source (not shown). The preferred electroluminescent embodiment of work light 68 has at least two advantages: it burns cool and will not injure a user, and it emits no infrared-band light so that night vision of a user will not be impaired by employing work light 68 to illuminate some work adjacent to the fishing location.

Figure 3:
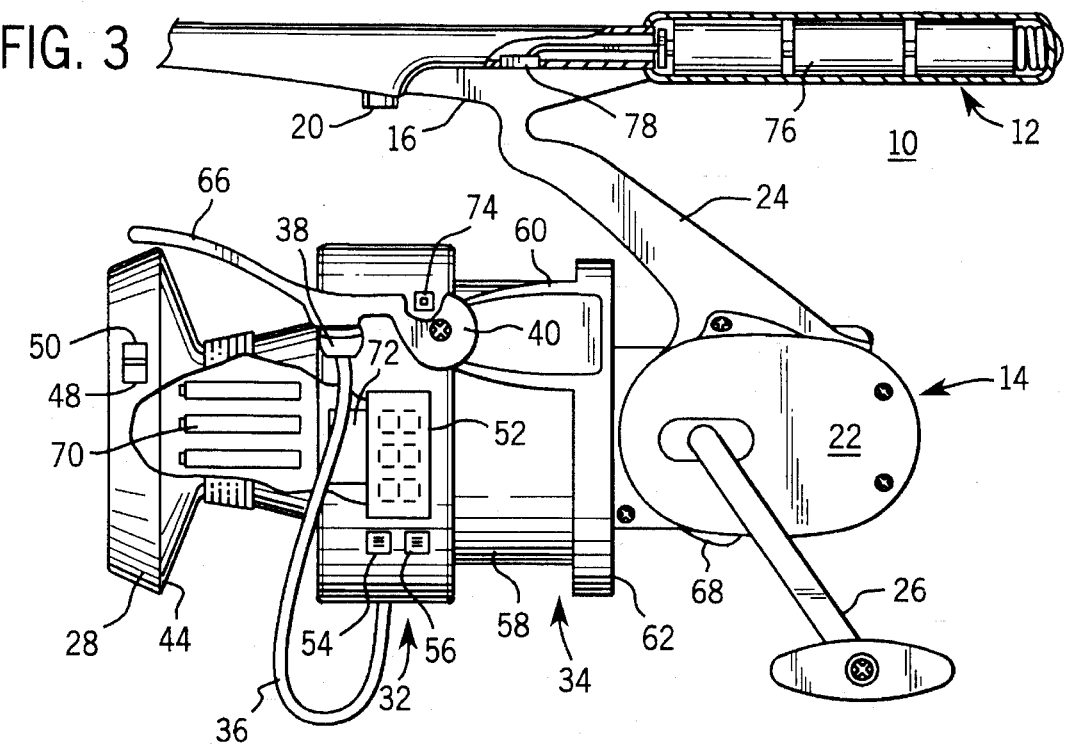
FIG. 3 is a partial section view of the fishing reel illustrated in FIGS. 1 and 2 with portions broken away to illustrate internal details of the preferred embodiment of the present invention.

FIG. 3 is a partial section view of the fishing reel illustrated in FIGS. 1 and 2 with portions broken away to illustrate internal details of the preferred embodiment of the present invention. In FIG. 3, fishing reel 14 is illustrated as containing within its spool 28 a plurality of batteries 70 and a microprocessor 72. The operative connections to provide an electrical coupling among batteries 70, microprocessor 72, light source 48, and light sensor 50 are not shown in detail in FIG. 3 because such connections are well within the skill of one skilled in the art and the details of such connections are not part of the invention herein. To show such connections would unnecessarily clutter the drawings and confuse the explanation of the present invention.

Further illustrated in FIG. 3 is a switch 74 adjacent cam member 40. Switch 74 is responsive to the position of cam member 40 to determine whether cam member 40 is in a first position (FIGS. 1–3) to facilitate casting of line 42 or in a second position (not shown) to facilitate retrieval of line 42. Thus, switch 74 is operatively connected with microprocessor 72 and informs microprocessor 72 whether to count up or count down to reflect line 42 as paying out or being retrieved. Further illustrated in FIG. 3 are a plurality of batteries 76 within fishing rod 12. Batteries 76 are electrically connected with a hot shoe connection 78 within rod 12 which is adjacent to mounting shoe 16 and electrically connected with mounting shoe 16. Thus, no separate wires are required to provide power from batteries 76 to either work light 68 or to the line indicating apparatus which includes light source 48, light sensor 50, switch 74, microprocessor 72, display unit 52, and switches 54, 56. The particular connections among the batteries and the various components are not shown since their configuration is well within the scope of knowledge of those skilled in the art of electrical connection among electronic components.

Many spinning reels of the sort illustrated in FIGS. 1–3 have a drag feature included in their spool construction. Such a drag feature provides an adjustable drag setting capability so that spool 28 will rotate about axis 30 when sufficient load is placed on line 42 (such as a large fish). In such drag-capable configurations, the passage of cam extension 66 (or line 42 in an appropriately proportioned reel) past sensor 50 actually registers an increment of line deployment when the spool rotates, rather than registering an increment of line retrieval. Thus, when a reel is drag-capable configured, a spool rotation sensor must be provided (such as a switch or other sensor) to detect rotational movement of spool 28 about axis 30. Such a spool rotation sensor would provide an indicator to microprocessor 72 to count up (indicating line payout) for sensations noted by sensor 50 when spool 28 is being "dragged" (i.e., when spool 28 is rotating about axis 30).

Figure 4:
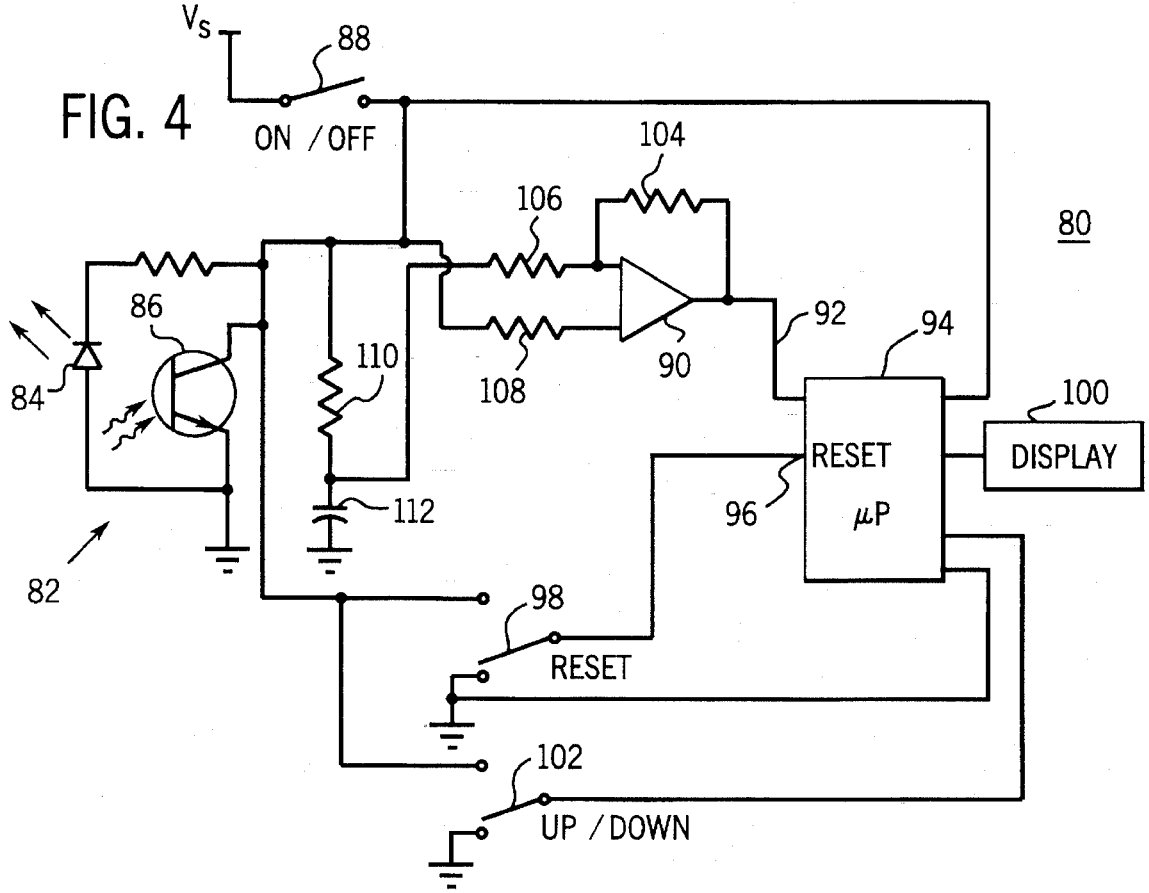
FIG. 4 is an electrical schematic diagram of the apparatus for indicating line deployment and retrieval according to the preferred embodiment of the present invention.

FIG. 4 is an electrical schematic diagram of the apparatus for indicating paying out of line according to the preferred embodiment of the present invention. In FIG. 4, an electronic line monitoring apparatus 80 includes a line sensing section 82, which includes a light source such as a light emitting diode 84 and a light detector such as a photosensitive transistor 86. Line sensing section 82 is connected with a supply voltage $V_s$ via an on/off switch 88, by which power to the electric line monitoring apparatus 80 is controlled. Line sensing section 82 is connected with an amplifier 90. Amplifier 90 amplifies signals received from line sensing section 82 indicating light detection generated by photosensitive transistor 86, and amplifier 90 provides all amplified output signal via a line 92 to a microprocessor 94.

Microprocessor 94 has a reset pin 96 connected with a reset switch 98 by which a display 100 and any counts contained within microprocessor 94 may be reset. Display 100 is operatively connected with microprocessor 94 and is responsive to microprocessor 94. An up/down count switch 102 controls whether microprocessor 94 counts up or counts down. It is a switch such as up/down count switch 102 which is contemplated as switch 74 in FIGS. 1–3. Resistors 104, 106, 108 are appropriately valued to set operating parameters for amplifier 90 as desired. Resistor 110 and capacitor 112 filter alternating transients from the output from line sensing section 82 before that output is applied to amplifier 90.

It is to be understood that, while the detailed drawings and specific examples given describe preferred embodiments of the invention, they are for the purpose of illustration, that the apparatus of the invention is not limited to the precise details and conditions disclosed, and that various changes may be made therein without departing from the spirit of the invention which is defined by the following claims.

I claim:

1. An improved fishing reel, comprising:

a substantially stationary spool including means for winding a line onto the spool in order to retrieve said line and means for unwinding said line from said spool in order to pay out said line;

an electrical power source substantially fixedly mounted with respect to the fishing reel;

an active light source coupled with said electrical power source, said light source being fixedly mounted with respect to the spool;

a light sensor fixedly mounted with respect to said spool, wherein said light source is located substantially adjacent said light sensor, said line repeatedly effecting traversal of a predetermined zone adjacent said light source and said light sensor during said line payout, said line reflecting light from said light source to said light sensor appropriately to establish optical coupling intermediate said light source and said light sensor for a coupling period during each said traversal; and a display means coupled with said light sensor for displaying at least one parameter relating to said line during said payout, said display means being responsive to said plurality of interruptions to algorithmically determine said at least one parameter.

2. An improved fishing reel, comprising:

a substantially stationary spool having means for winding a line onto the spool in order to retrieve the line and means for unwinding the line from the spool in order to pay out the line, the line intermittently moving into and out of a scanning zone during pay out;

a light source fixedly mounted with respect to the spool to illuminate the scanning zone;

an electrical power source coupled with the light source for powering the light source;

a light sensor fixedly mounted with respect to the spool in a position for sensing movement of the line into and out of the scanning zone; and a display coupled to the light sensor for displaying a parameter relating to line movements sensed by the light sensor during pay out.

3. An improved fishing reel in accordance with claim 2, wherein the light source is a light emitting diode.

4. An improved fishing reel in accordance with claim 3, wherein the display is a liquid crystal display.

5. An improved fishing reel in accordance with claim 2, wherein the winding means includes an extension intermittently moving into and out of the scanning zone during retrieval, the light sensor sensing movement of the extension into and out of the scanning zone, the displayed parameter relating to the line movements during pay out and the extension movements during retrieval.

6. An improved fishing reel in accordance with claim 5, further comprising:

a microprocessor having a power coupling to the electrical power source and operative couplings to the light sensor and the display, the microprocessor storing a count, the microprocessor counting up for each movement of the line into the zone and counting down for each movement of the extension into the zone.

7. An improved fishing reel in accordance with claim 2, further comprising an illumination means affixed to the reel, the illumination means coupled with the electrical power source and oriented to illuminate a work zone adjacent the reel.

8. An improved fishing reel in accordance with claim 7, wherein the fishing reel is affixed with a fishing rod, the electrical power source includes a battery source located inside the fishing rod, at least one of the light source, the display means, and the illumination means being electrically connected with the battery source through a hot shoe connection intermediate the fishing reel and the fishing rod.

9. A fishing reel in accordance with claim 2, wherein the scanning zone is substantially adjacent the light source and the light sensor, each movement of the line into the scanning zone causing light to reflect from the light source to the light sensor.

* * * * *